Aug. 16, 1955  G. G. ALEXANDER  2,715,484
ICE CREAM PACKING NOZZLE
Filed Jan. 25, 1952
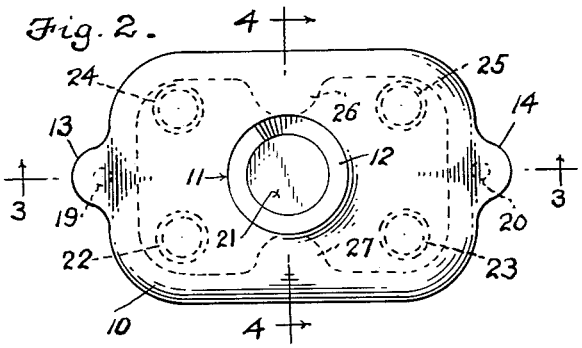
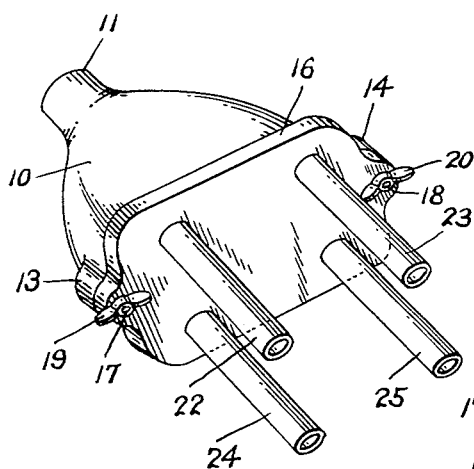
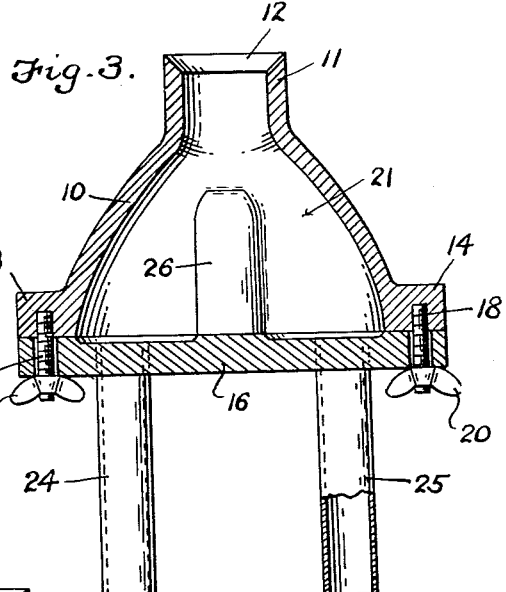
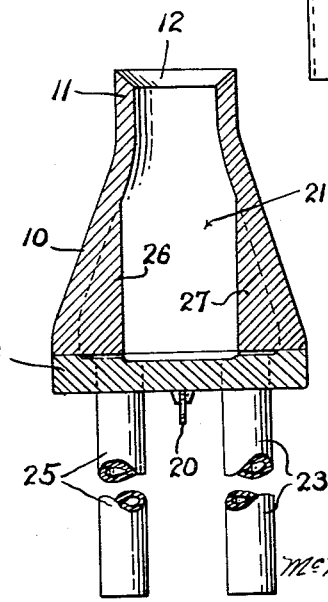
INVENTOR.
George G. Alexander
BY
McMorrow, Berman & Davidson
ATTORNEYS

United States Patent Office 2,715,484
Patented Aug. 16, 1955

2,715,484
ICE CREAM PACKING NOZZLE
George G. Alexander, Savannah, Tenn.

Application January 25, 1952, Serial No. 268,273

3 Claims. (Cl. 222—478)

This invention relates to ice cream packing equipment and more particularly to an improved nozzle for distributing ice cream from a dispensing pump into receptacles or molds or into the compartments of form boxes for manufacturing ice cream sandwiches, this application constituting an improvement of my application Serial No. 218,407, filed March 30, 1951, for Ice Cream Packing Equipment.

It is among the objects of the present invention to provide an improved multiple nozzle distributor or distributor head for distributing ice cream in a plastic condition from a dispensing pump into molds or the compartments in a form box for filling cartons, manufacturing ice cream bricks or sandwiches, or for similar operations; which provides a reservoir for ice cream adjacent the inlet ends of the distributing nozzles to provide an even flow of ice cream through the nozzles; which is effective for different operations as filling molds or cartons and manufacturing sandwiches, whereas, in my prior application, referred to above, different distributors were provided for the different operations; and which is simple and durable in construction, economical to manufacture, easy to use, and positive and effective in operation.

Other objects and advantages will become apparent from the consideration of the following description and the appended claims in conjunction with the accompanying drawing wherein:

Figure 1 is a perspective view of an ice cream distributing head illustrative of the invention;

Figure 2 is a top plan view of the distributing head illustrated in Figure 1;

Figure 3 is a longitudinal cross sectional view on the line 3—3 of Figure 2; and Figure 4 is a transverse cross sectional view on the line 4—4 of Figure 2.

With continued reference to the drawing, the distributing head of the present invention comprises a hollow housing 10 which is bell shaped or pyramidal in shape and of substantially rectangular cross sectional shape. This housing is formed of a suitable material, such as cast aluminum, and has its base end open. A tube fitting 11 in the form of a hollow boss of cylindrical shape projects from the apex of the pyramidal or bell shaped housing to be received in one end of a hose, the other end of which is connected to an associated dispensing pump, and the outer end of the boss 11 is internally beveled, as indicated at 12, to facilitate the passage of ice cream from the hose into the housing 10.

Rounded lugs 13 and 14 project outwardly from the housing, one at each end of the open or base end of the latter, and each of these lugs is provided with a tapped hole or well opening to the base end of the housing.

A flat cover plate 16, also preferably formed of suitable material, such as cast aluminum, is disposed in closing relationship to the open end of the housing 10 and is provided with apertures disposed one at each end thereof and registering with the tapped holes in the lugs 13 and 14. Screw threaded studs 17 and 18 are threaded into the tapped holes in the lugs 13 and 14 respectively, and extend through the corresponding apertures in the plate 16, wing nuts 19 and 20 being threaded onto these studs at the side of the plate 16 remote from the housing 10 to firmly secure the plate to the housing and constitute in the interior of the housing a chamber or reservoir 21 for holding a limited supply of ice cream.

The plate 16 is provided with apertures disposed one adjacent each corner thereof and distributing nozzles, as indicated at 22, 23, 24, and 25, of tubular cylindrical shape are secured one in each of the apertures in the plate 16. Each nozzle is secured at one end in the corresponding aperture in the plate 16 and the nozzles project from the side of the plate 16 remote from the housing 10 in spaced apart and substantially parallel relationship to each other.

Ribs 26 and 27 are provided interiorly of the housing 10, one at each side and intermediate the length of the housing, the rib 26 being disposed substantially midway between the nozzles 24 and 25, and the rib 27 being disposed substantially midway between the ribs 22 and 23. These ribs extend substantially perpendicularly from the closure plate 16 to locations spaced from the proximal end of the fitting or boss 11 and assist in assuring a substantially even distribution of ice cream from the reservoir chamber 21 into the inlet ends of the several nozzles.

By providing the reservoir chamber 21 at the inlet ends of the distributing nozzles, a constant and uniform supply of ice cream to all of the nozzles is obtained, and the arrangement of the nozzles permit the use of the one distributing head for the various operations mentioned above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A distributing head for ice cream dispensing apparatus comprising a hollow housing having an open end and a closed end provided on its closed end with an apertured boss adapted to receive one end of a hose leading from an associated dispensing pump, a closure plate secured to said housing in covering relationship to the open end of the latter and having spaced apart apertures therein, and tubular nozzles secured one in each of said apertures each at one end thereof and projecting from the side of said closure plate remote from said housing, said closure plate being of substantially rectangular shape and said apertures being disposed one adjacent each corner thereof and said housing having internal ribs therein extending perpendicularly from said closure plate to locations spaced from the proximal end of said apertured boss one at each side of said housing and substantially at the mid-length location of said closure plate.

2. A distributing head for ice cream dispensing apparatus comprising a hollow housing having a closed end provided with an apertured boss adapted to receive one end of a hose leading from an associated dispensing pump and an open end of greater area than said closed end, a closure plate detachably secured to said housing in covering relationship to the open end of the latter and having spaced apart apertures therein, and tubular nozzles secured one in each of said apertures each at one end thereof and projecting from the side of said closure plate remote from said housing, said housing being substantially bell shaped with said apertured boss extending from the apex thereof and having oppositely disposed internal ribs therein, said housing and said closure plate together enclosing a chamber for holding a limited quantity of ice cream and equalizing the flow of ice cream from the several nozzles of the distributing head and said internal ribs severing to guide the ice cream through said chamber from said boss to said nozzle to facilitate the even distribution of the ice cream to the several nozzles.

3. A distributing head for ice cream dispensing apparatus comprising a hollow housing having a closed end provided with an apertured boss for connection to an associated dispensing pump and having an open end of greater area than said closed end, a closure plate detachably secured to said housing in covering relationship to the open end of the latter and having spaced apart apertures therein, tubular nozzles each secured at one end in a corresponding aperture in said closure plate and projecting from the side of said closure plate remote from said housing, said housing and said closure plate together enclosing a chamber for holding a limited quantity of ice cream and equalizing the flow of ice cream through the several nozzles of the distributing head, and means in said housing service to guide the ice cream through said chamber from said boss to said nozzle to facilitate the even distribution of the ice cream to the several nozzles.

References Cited in the file of this patent

UNITED STATES PATENTS

| | | |
|---|---|---|
| 2,056,191 | Peltz | Oct. 6, 1936 |
| 2,451,011 | Yoars | Oct. 12, 1948 |
| 2,657,649 | Daanen et al. | Nov. 3, 1953 |